(12) United States Patent
Callomon et al.

(10) Patent No.: US 9,810,972 B2
(45) Date of Patent: Nov. 7, 2017

(54) ROBOT SPECIMEN PHOTOGRAPHY MOUNT

(71) Applicants: Paul Callomon, Cherry Hill, NJ (US); Abdelkaoui Abdelkaoui, Philadelphia, PA (US); Kartikey Dadoo, Plano, TX (US); Paul Holleger, Alpharetta, GA (US); Aaron Krick, Doylestown, PA (US); Robin Rehmat, Columbus, OH (US)

(72) Inventors: Paul Callomon, Cherry Hill, NJ (US); Abdelkaoui Abdelkaoui, Philadelphia, PA (US); Kartikey Dadoo, Plano, TX (US); Paul Holleger, Alpharetta, GA (US); Aaron Krick, Doylestown, PA (US); Robin Rehmat, Columbus, OH (US)

(73) Assignee: Drexel University, Philadelphia, PA (US)

(*) Notice: Subject to any disclaimer, the term of this patent is extended or adjusted under 35 U.S.C. 154(b) by 94 days.

(21) Appl. No.: 15/081,976

(22) Filed: Mar. 28, 2016

(65) Prior Publication Data

US 2016/0282258 A1    Sep. 29, 2016

Related U.S. Application Data

(60) Provisional application No. 62/139,203, filed on Mar. 27, 2015.

(51) Int. Cl.
*G03B 15/00*      (2006.01)
*F16M 11/00*      (2006.01)
*G03B 17/56*      (2006.01)
*G03B 37/02*      (2006.01)

(52) U.S. Cl.
CPC .......... *G03B 17/561* (2013.01); *F16M 11/00* (2013.01); *G03B 37/02* (2013.01)

(58) Field of Classification Search
None
See application file for complete search history.

(56) References Cited

U.S. PATENT DOCUMENTS

| | | |
|---|---|---|
| 3,188,909 A | 6/1965 | Wally, Jr. et al. |
| 3,221,596 A | 12/1965 | Hoffman |
| 3,690,242 A * | 9/1972 | Cruickshank .......... G03B 15/00 355/48 |

(Continued)

OTHER PUBLICATIONS www.academicimaging.com/specs/aiaxact-vh-dual-copystand.html. Dec. 10, 2014. 3 pages.

(Continued)

*Primary Examiner* — W B Perkey
(74) *Attorney, Agent, or Firm* — Joseph E. Maenner; Maenner & Associates, LLC (57) ABSTRACT

A robot specimen photography mount includes a base, a cradle support assembly extending upwardly from the base, and a cradle rotatably supported by the cradle support assembly. A rotation motor is mounted on the cradle. A specimen mount is rotatably mounted on the rotation motor. The specimen mount has a vacuum opening formed therein. A vacuum conduit is in fluid communication with the vacuum opening. A method of operating the photography mount is also disclosed.

20 Claims, 7 Drawing Sheets

(56) References Cited

U.S. PATENT DOCUMENTS

| | | | |
|---|---|---|---|
| 4,372,659 A * | 2/1983 | Ogawa | G03B 15/00 396/24 |
| 4,675,993 A | 6/1987 | Harada | |
| 4,787,595 A | 11/1988 | Hegarty | |
| 4,951,072 A | 8/1990 | Harvey et al. | |
| 5,184,160 A | 2/1993 | Massarsky | |
| 5,857,119 A * | 1/1999 | Borden | G03B 15/00 396/428 |
| 5,865,487 A | 2/1999 | Gore et al. | |
| 7,852,403 B2 | 12/2010 | Tsai et al. | |
| 8,781,311 B1 | 7/2014 | Hatzav et al. | |
| 2001/0041064 A1 | 11/2001 | Huebner | |
| 2008/0017767 A1 | 1/2008 | Sheffield et al. | |
| 2008/0035818 A1 | 2/2008 | Sheffield et al. | |
| 2011/0069880 A1 | 3/2011 | Sergieiev | |
| 2012/0177350 A1 | 7/2012 | Jancourtz | |
| 2013/0279893 A1 | 10/2013 | Roth et al. | |
| 2015/0319418 A1* | 11/2015 | Yahav | G03B 15/00 348/50 |
| 2016/0219192 A1* | 7/2016 | Rosenberry | H04N 5/2251 |
| 2016/0282258 A1* | 9/2016 | Callomon | F16M 11/00 |

OTHER PUBLICATIONS www.dazor.com/store/vacuum-gemstone-holder-system.html.
Printed Jan. 15, 2015. 2 pages.

* cited by examiner

ROBOT SPECIMEN PHOTOGRAPHY MOUNT

CROSS-REFERENCE TO RELATED APPLICATION

The present application claims the benefit of U.S. Provisional Patent Application Ser. No. 62/139,203, filed on Mar. 27, 2015, the contents of which are incorporated herein by reference in its entirety.

BACKGROUND OF THE INVENTION

Small, fragile natural history specimens, such as insects, small mollusk shells, and others are typically photographed from multiple angles to record the specimen. The specimens have been traditionally mounted on a specimen mount using adhesives or clay, which can leave residue on the specimen and possibly damage the surface of the specimen. The vacuum mounts have been developed to overcome the drawbacks of the adhesives or clay. These vacuum mounts, however, are static, requiring the specimen to be manually repositioned in order to take pictures from different angles, thereby risking losing or damaging the specimen.

It would be beneficial to provide a vacuum mount that can be moved in order to be able to photograph specimen from different angles without having to move the camera.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a robot specimen photography mount that includes a base, a cradle support assembly extending upwardly from the base, and a cradle rotatably supported by the cradle support assembly. A rotation motor is mounted on the cradle. A specimen mount is rotatably mounted on the rotation motor. The specimen mount has a vacuum opening formed therein. A vacuum conduit is in fluid communication with the vacuum opening.

In another embodiment, the present invention is a method of retaining and manipulating a specimen comprising steps of providing the robot specimen photography mount described above; drawing a vacuum through the vacuum conduit; placing the specimen on the specimen mount over the vacuum opening; rotating the cradle relative to the cradle support; and rotating the specimen mount relative to the cradle.

BRIEF DESCRIPTION OF THE DRAWINGS

The aspects, features, and advantages of the present invention will become more fully apparent from the following detailed description, the appended claims, and the accompanying drawings in which like reference numerals identify similar or identical elements.

DETAILED DESCRIPTION OF THE INVENTION

In the drawings, like numerals indicate like elements throughout. Certain terminology is used herein for convenience only and is not to be taken as a limitation on the present invention. The terminology includes the words specifically mentioned, derivatives thereof and words of similar import.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Referring to the Figures, a specimen mount 100 according to a first exemplary embodiment of the present invention is shown. While mount 100 is used to mount fragile museum specimens for photographing, those skilled in the art will recognize that mount 100 can be used to secure other fragile and/or small specimens as well.

Mount 100 uses no adhesives or other clinging substances that can damage specimens or leave residues on them. Mount 100 only requires each specimen to be positioned once, reducing handling. Mount 100 can be operated from the same computer screen that is showing the video image from the camera, allowing accurate hands-off positioning.

Figure 1:
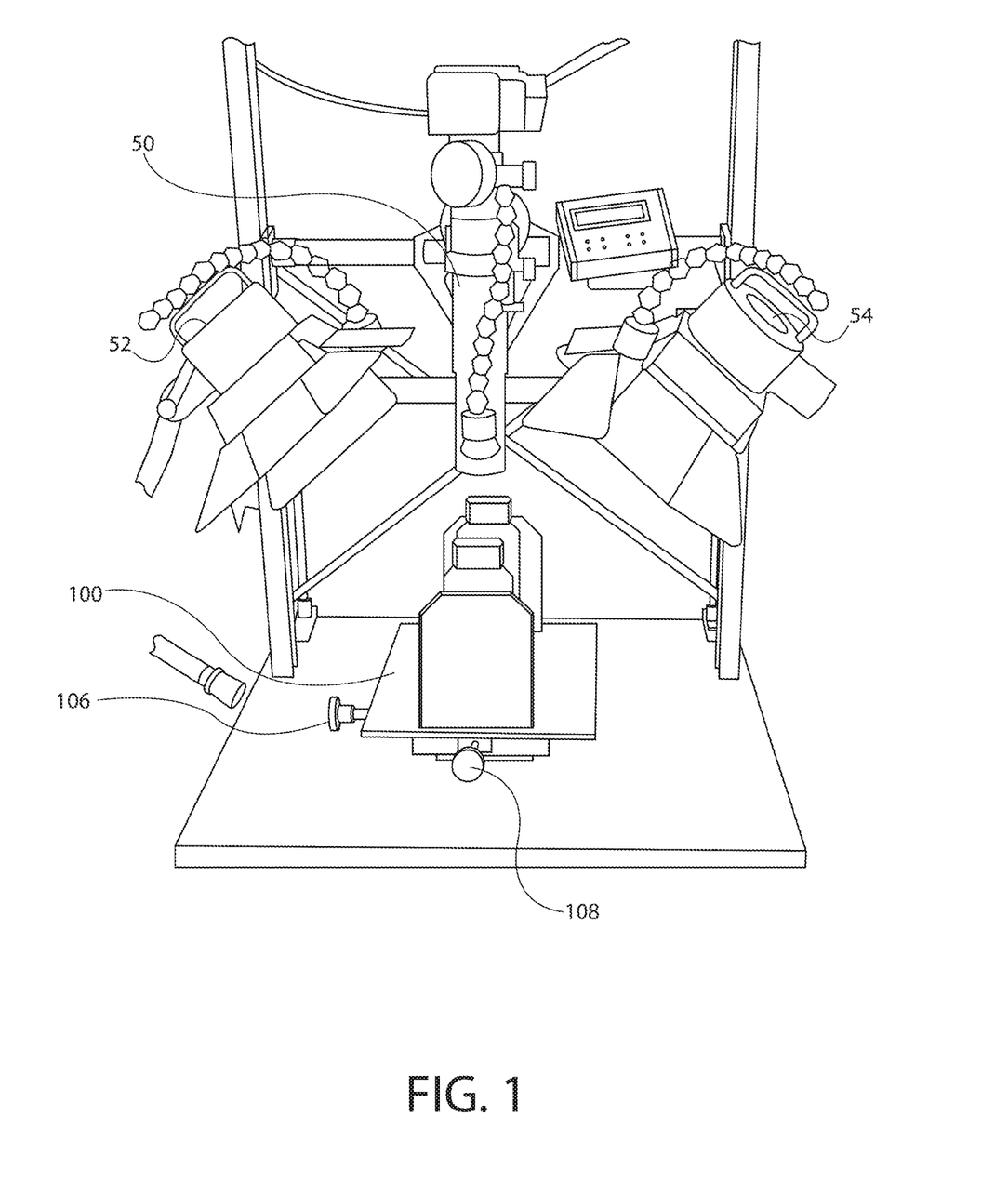
FIG. 1 is a perspective view of a specimen mount according to an exemplary embodiment of the present invention used with camera and light arrangement.

Referring to FIG. 1, mount 100 is used in connection with a camera 50 that is used to take photographs/videos of a specimen 60 that is supported by mount 100. As shown in FIG. 1, lights 52, 54 can be mounted and positions to shine light on specimen 60 to assist in photographing specimen 60. Mount 100 is sized such that lights 52, 54 can be positioned close enough to specimen 60, yet not interfere with operation of mount 100 or camera 50. In an exemplary embodiment, the elements and pieces that constitute mount 100 can be black in color in order to absorb light and minimize reflection to provide enhanced photographic results.

Figure 2:
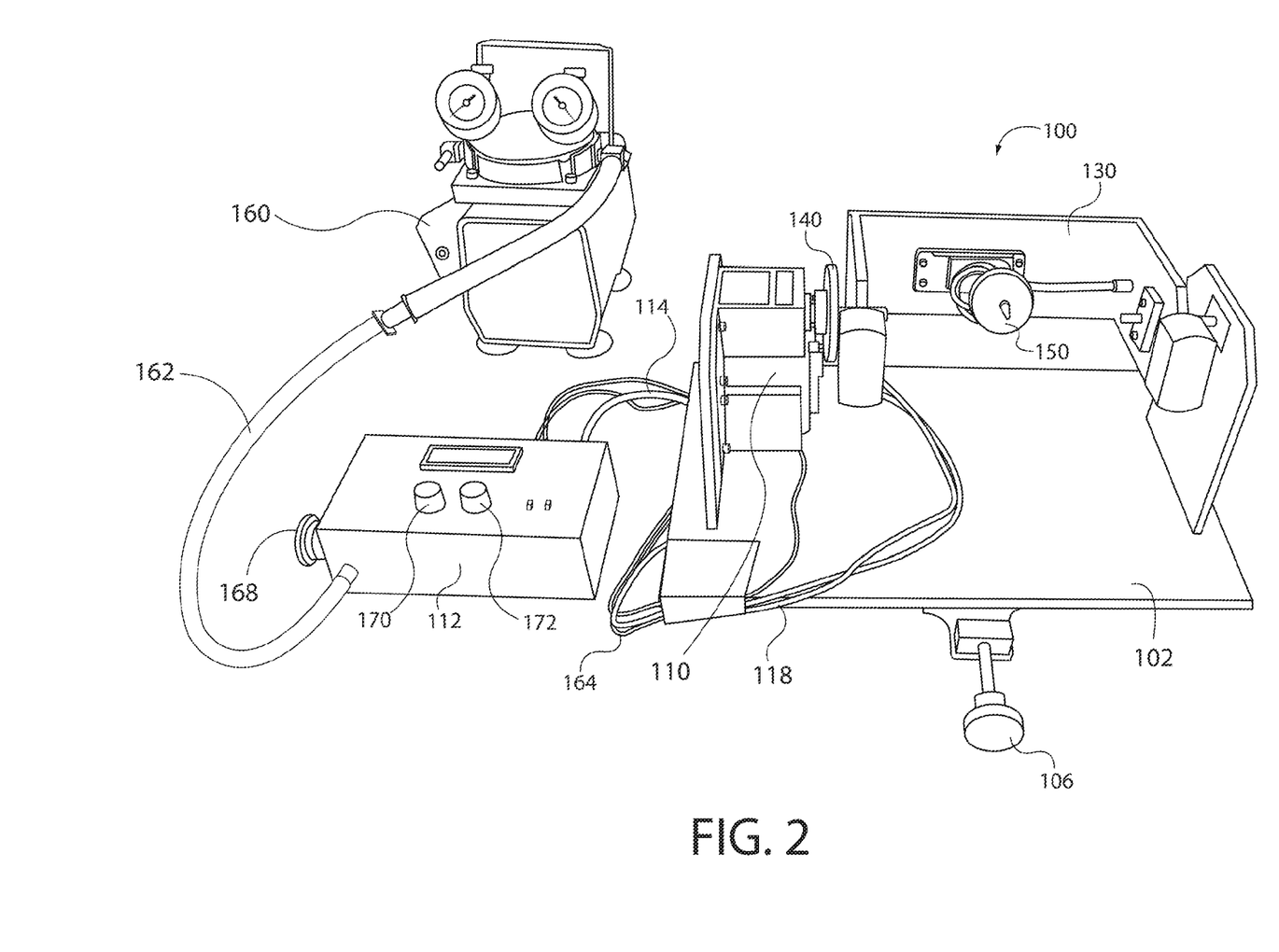
FIG. 2 is a front perspective view of the specimen mount of FIG. 1, with a vacuum pump and controller.
Figure 2A:
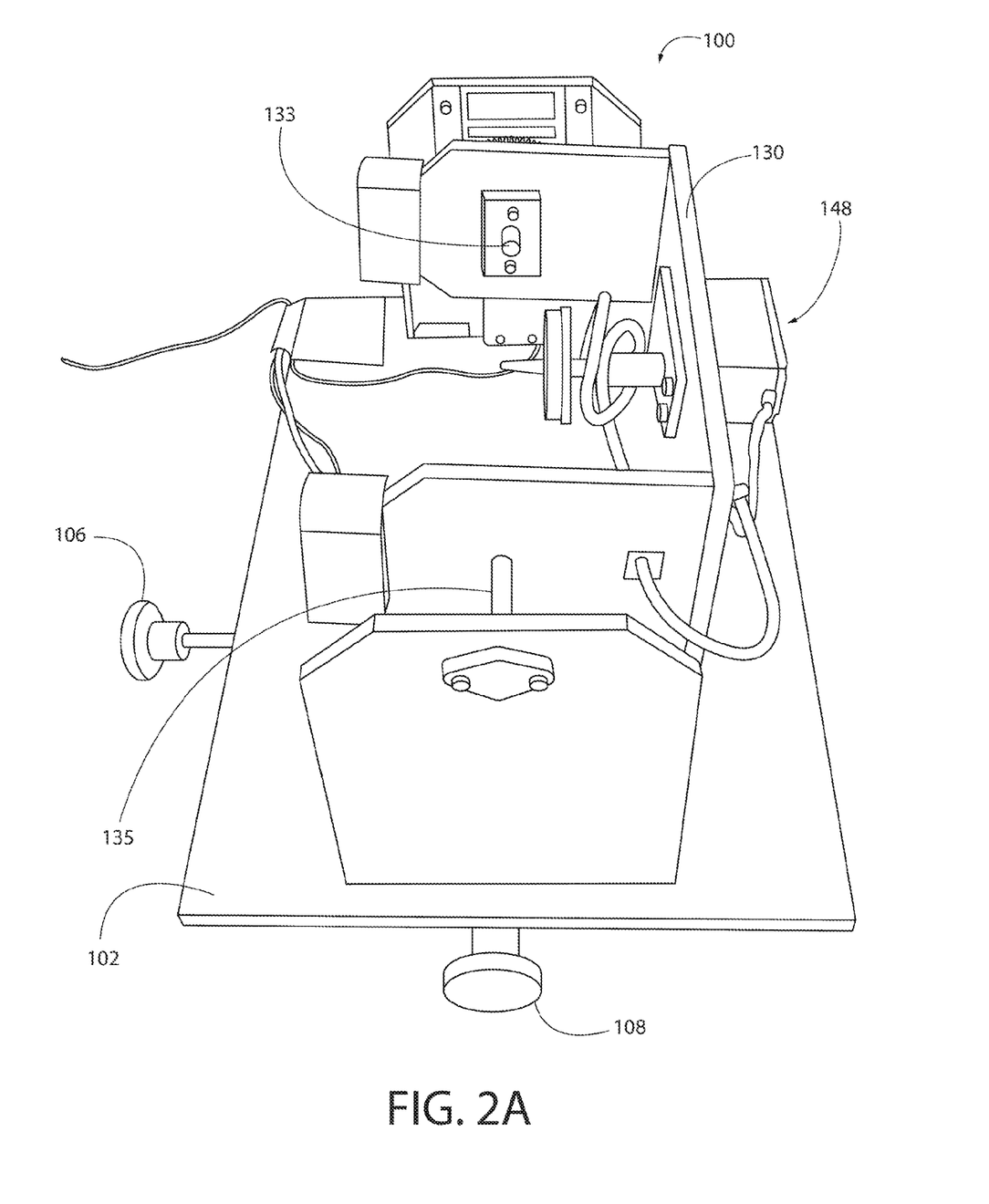
FIG. 2A is a side perspective view of the specimen mount of FIG. 2.
Figure 2B:
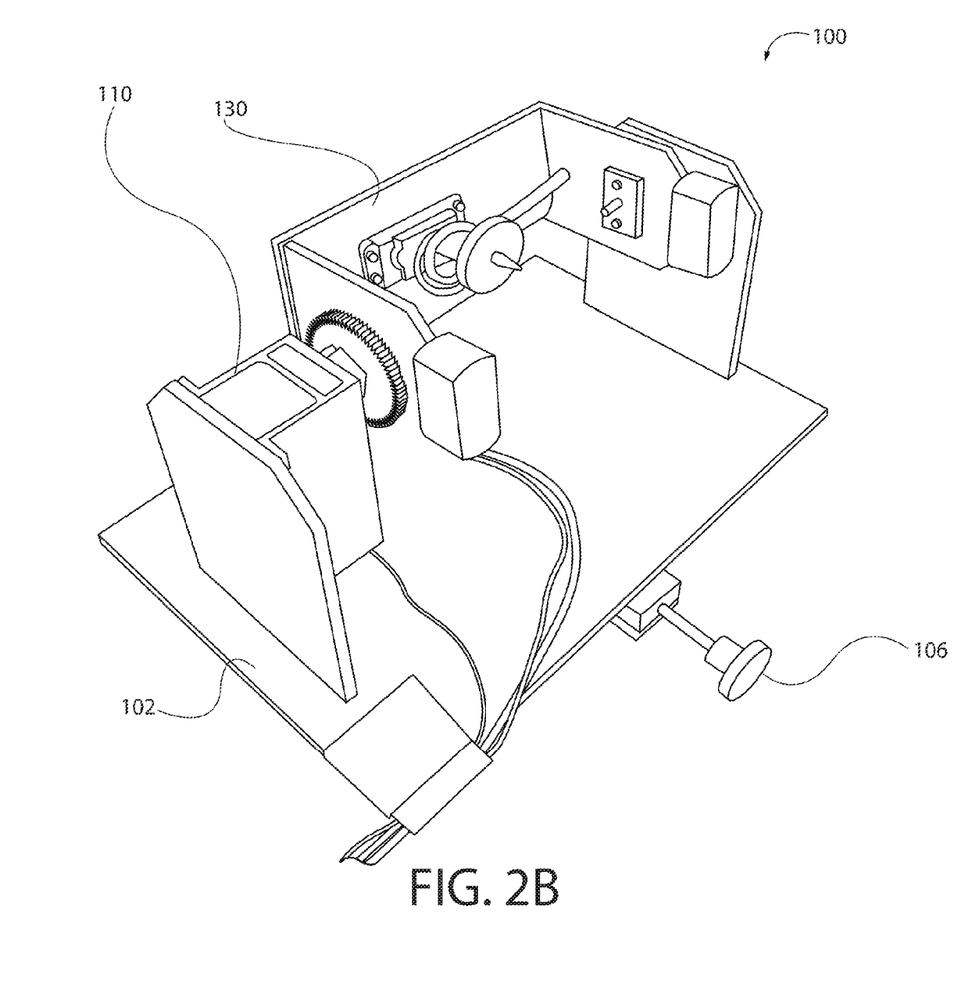
FIG. 2B is a perspective view of the specimen mount of FIG. 2.
Figure 3:
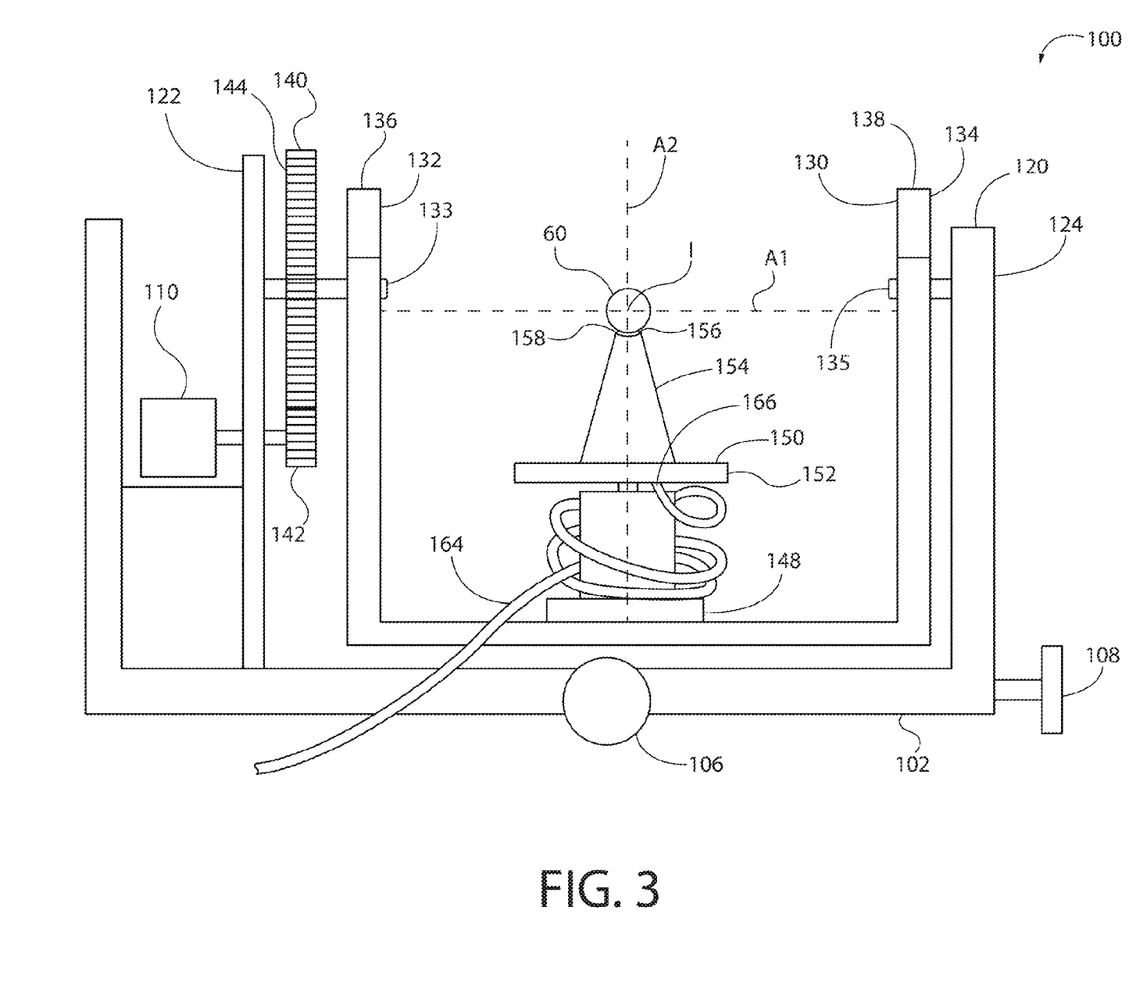
FIG. 3 is a side elevational view of the specimen mount of FIG. 2.

Referring now to FIGS. 2-2B and 3, mount 100 includes a base 102 on which a cradle motor 110 and a cradle support assembly 120 are mounted. Cradle motor 110 can be an electrically operated motor electrically connected to a controller 112 by electrical wires 114. Base 102 can be adjusted in an x-y plane of base 102 by adjustment screws 106, 108.

Cradle support assembly 120 includes a first vertical support 122 and a second vertical support 124. First and second vertical supports 122, 124, respectively, extend generally vertically upward from base 102. First vertical support 122 is located proximate to cradle motor 110, while second vertical support 124 is located distal from cradle motor 110.

A cradle support assembly 120 is used to pivotally support a cradle 130 on which specimen 60 is mounted. Cradle 130 includes a first arm 132 that is pivotally connected to first vertical support 122 via a first pivot pin 133 and a second arm 134 that is pivotally connected to second vertical support 124 via a second pivot pin 135. First arm 132 extends in a plane generally parallel to second arm 134. Additionally, first pivot pin 133 and second pivot pin 135 extend coaxially along a pivot axis A1.

Optionally, as shown FIG. 3, a first counterweight 136 can be attached. A first arm 132 above first pivot pin 133 and a second counterweight 138 can be attached to second arm 134 above second pivot pin 135. Counterweights 136, 138 offset the weight of cradle 130 during rotation of cradle 130 about first and second pivot pins 133, 135 in order to reduce the load applied to cradle motor 110, particularly when cradle 130 is in the position shown in FIG. 2B.

Cradle motor 110 is operatively connected to first arm 132 via a gear assembly 140. Gear assembly 140 includes a drive gear 142 that is operatively attached to an output shaft 116 of cradle motor 110. A larger rotation gear 144 is engaged with drive gear 142, such that rotation of drive gear 142 rotates rotation gear 144 at a significantly reduced speed. The reduced speed provides for increased controllability of the rotation of cradle 130. In an exemplary embodiment, the gear ratio between rotation gear 144 and drive gear 142 is about 3.8:1, although those skilled in the art will recognize that other gear ratios can be used. In an exemplary embodiment, cradle motor 110 can rotate cradle 130 360 degrees around axis A1, although it may be desired to include stop limits to avoid hitting camera 50. A relatively high gear ratio can provide for finer control of the pivoting of cradle 130.

A cradle platform 140 extends between first arm 132 and second arm 134, distal from counterweights 136, 138. Cradle platform 140 supports a specimen mount 150 onto which specimen 60 can be removably placed. Specimen mount 150 is rotatably mounted on a rotation motor 148 that is fixed to cradle platform 140 such that, as cradle 130 rotates about axis A1, rotation motor 148 rotates with cradle 130.

Rotation motor 148 can be an electrically operated motor electrically connected to controller 112 by electrical wires 118. Rotation motor 148 rotates specimen mount 150 up to 360 degrees along a rotation axis A2 that extends generally orthogonally to axis A1 and intersects axis A1 at an intersection "I".

Specimen mount 150 extends upwardly from cradle platform 140 a sufficient distance such that, when specimen 60 is attached to specimen mount 150, both axes A1 and A2 extend through specimen 60 such that, regardless of rotation of cradle 130 and/or specimen mount 150, specimen 60 is always located and maintained at intersection I.

Additionally, as cradle support assembly 120 pivots about axis A1, specimen 60 remains in the same general location, such that both axes A1 and A2 always extend through specimen 60. This feature is beneficial when photographing specimen 60, eliminating the need for camera 50 to have to be refocused and/or repositioned every time that specimen 60 is moved via rotation of cradle platform 140 and/or rotation of specimen mount 150. An added benefit of this feature is the ability to fixedly locate camera 50 with respect to mount 100.

Specimen mount 150 includes a support 154 that extends generally outwardly from rotation motor 148. A generally circular base 152 is mounted at the bottom of support 154. Optionally, base 152 can be constructed from a soft material, such as, for example, open cell foam such that, if specimen 60 happens to fall from specimen mount 150, if specimen 60 falls on to base 152, the likelihood of specimen 60 cracking or breaking is greatly reduced.

Support 154 is hollow and has a vacuum opening 156 at a distal tip 158 thereof. Specimen 60 is placed on distal tip 158 over opening 156. Specimen 60 is maintained on distal tip 158 by a suction, or vacuum, that is generated by a vacuum pump 160, shown in FIG. 2. Vacuum pump 160 includes a first vacuum line 162 that is connected to controller 112. Controller 112 is used to adjust the amount of vacuum applied to support 154 via a second vacuum line 164. A connected end 166 of second vacuum line 164 is connected to support 154. As shown in FIG. 3, second vacuum line 164 is loosely wrapped several rotations around motor 148 in a cochlear fashion. This wrapping allows the rotation of support 154 for several revolutions in a particular direction without second vacuum line 164 binding around motor 148.

Figure 4:
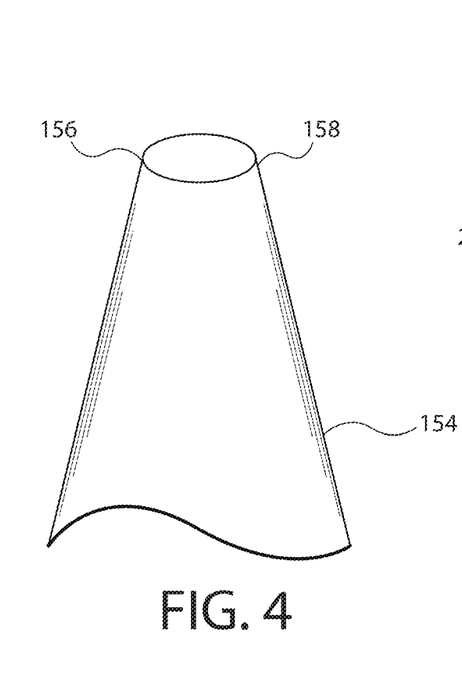
FIG. 4 is a side elevational view of a first exemplary embodiment of a support used in the specimen mount of FIG. 2.

Referring now to FIG. 4, distal tip 158 of support 154 is shown in detail. An opening 156 is formed in distal tip 158. Opening 156 is in fluid communication with second vacuum line 164. Opening 156 is shaped such that, when specimen 60 is mounted on support 154, opening 156 is not fully occluded, such that outside air is bled in through the portion of opening 156 that is not occluded. Such a bypass air bleed reduces the amount of vacuum applied directly to specimen 60, reducing the likelihood that the vacuum applied to specimen 60 may be too strong for specimen 60, resulting in cracking or breaking of specimen 60 as a result of the applied vacuum.

Figure 5:
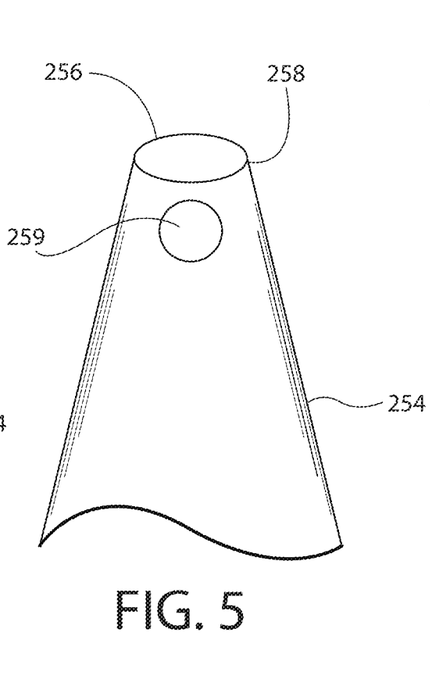
FIG. 5 is a side elevational view of a second exemplary embodiment of a support used in the specimen mount of FIG. 2.

In an alternative embodiment of a support 254 shown in FIG. 5, distal tip 258 includes a vacuum opening 256 onto which specimen 60 (not shown in FIG. 5) can be mounted. Distal tip 258 further includes a bleed hole 259 that draws a portion of the vacuum therethrough, thereby reducing the vacuum draw through vacuum opening 256 and subsequently reducing the potential for damaging specimen 60.

Figure 6:
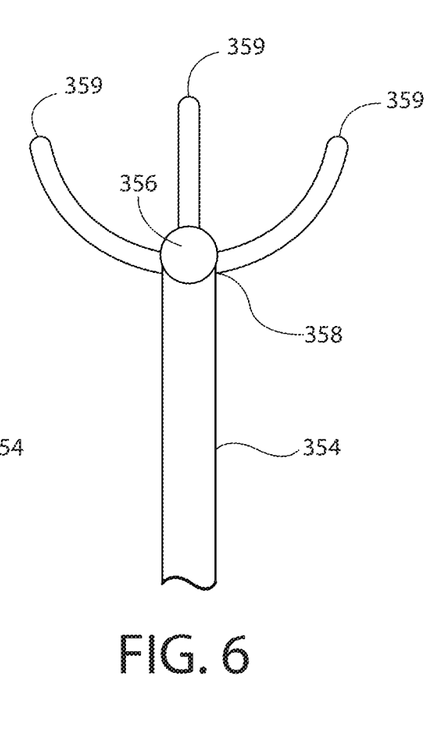
FIG. 6 is a side elevational view of a third exemplary embodiment of a support used in the specimen mount of FIG. 2.

In still another alternative embodiment of a support 354 shown in FIG. 6, distal tip 358 includes a plurality of fingers 359 that can be manipulated to support specimen 60 (not shown in FIG. 6). Although three fingers 359 are shown, those skilled in the art will recognize that more or less than three fingers 359 can be used. An opening 356 in the top of distal tip 358 draws vacuum into support 354. Spaces between fingers 359 reduce the vacuum draw through vacuum opening 356 and reduce the potential for damaging specimen 60.

Referring back to FIG. 2, controller 112 includes a first controller knob 170 that is used to rotate cradle motor 110 and a second controller knob 172 that is used to control rotation motor 148. Controller knobs 170, 172 can be rotated clockwise to operate their respective motors 110, 148 in one direction and counter-clockwise to operate their respective motors 110, 148 in a second, opposite direction.

While controller 112 is shown, those skilled in the art will recognize that other types of controller, such as, for example, a touch screen (not shown) or other type of Graphical User Interface ("GUI") can be used. Also, such controller can be pre-programmed with one or more predetermined sequences to operate motors 110, 148 such that specimen 60 is moved to predetermined camera views, such as, for example, front, left side, rear, right side, top, and bottom perspective views. Additionally, controller 112 or GUI can be used to adjust base 102 by providing remote operation of adjustment screws 106, 108.

To use mount 100, mount 100 can be set up with camera 50 and lights 52, 54, as shown in FIG. 1. In this configuration, cradle 130 is rotated about axis A1 such that axis A2 extends generally vertically.

A vacuum is applied by turning on vacuum pump 160 and applying a vacuum to support 154. A vacuum interrupter button 168 on controller 112 can be pressed can disrupt suction to allow the specimen to be manipulated without turning vacuum pump 160 on or off. With vacuum being applied, specimen 60 is placed on distal tip 158 of support 154. Controller knobs 170, 172 on controller 112 are used to operate cradle motor 110 and rotation motor 148 to rotate specimen 60 in desired directions about axis A1 and axis A2, maintaining specimen 60 at the point of intersection I between axis A1 and axis A2, such that camera 50 does not have to be refocused in order to photograph specimen 60. As specimen 60 is rotated, cradle motor 110 and rotation motor 140 can be stopped to photograph specimen 60 in desired locations.

As an alternative to controller knobs 170, 172, cradle motor 110 and rotation motor 140 can be electronically connected to a processor (not shown) such that a pre-arranged set of views to be graphically selected by an end-user. The processor would allow for automated positioning between views for more efficient photography of a large collection of specimens, reducing man-hours and increasing efficiency of use of mount 100.

Figure 7:
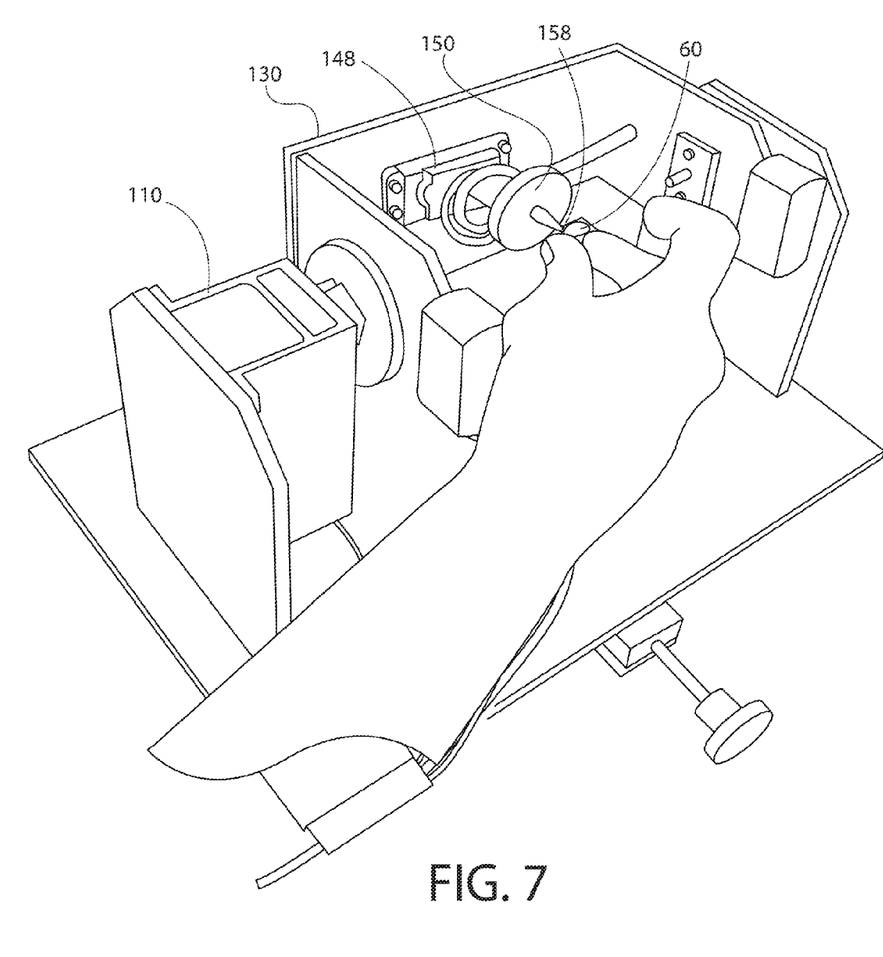
FIG. 7 is a perspective view showing a user inserting a specimen onto the specimen mount of FIG. 2.

FIG. 7 shows cradle 130 rotated about 90 degrees from vertical. A user places specimen 60 onto specimen mount 150. Vacuum pump 160 has already been turned on so that a vacuum is being drawn through distal tip 158 so that specimen 60 is retained on distal tip 158 for rotation by motors 110, 148.

After specimen 60 has been photographed, cradle motor 110 can be operated to rotate cradle 130 such that axis A2 extends generally vertically and specimen 60 is on top of support 154. An operator can grasp specimen 60, and, without removing specimen 60 from support 154, secure vacuum pump 160 or otherwise cease the application of vacuum to support 154 via vacuum switch 174. When the vacuum is removed from support 154, the operator can remove specimen 60 from support 154. The process can be repeated for additional specimens.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A robot specimen photography mount comprising:
   a base;
   a cradle support assembly extending upwardly from the base;
   a cradle rotatably supported by the cradle support assembly;
   a rotation motor mounted on the cradle;
   a specimen mount rotatably mounted on the rotation motor, the specimen mount having a vacuum opening formed therein; and
   a vacuum conduit in fluid communication with the vacuum opening.

2. The robot specimen photography mount according to claim 1, further comprising a cradle motor mounted on the base, the cradle motor operatively connected to the cradle to pivot the cradle relative to the cradle support.

3. The robot specimen photography mount according to claim 2, further comprising a controller operatively connected to the cradle motor, the rotation motor, and the vacuum conduit, such that operation of the controller selectively rotates the cradle motor, the rotation motor, and a vacuum applied through the vacuum conduit.

4. The robot specimen photography mount according to claim 3, wherein the controller further comprises a vacuum supply connection adapted to connect to a vacuum pump.

5. The robot specimen photography mount according to claim 4, wherein the controller further comprises a vacuum interrupter adapted to interrupt a vacuum drawn through the vacuum conduit from the vacuum supply connection.

6. The robot specimen photography mount according to claim 1, wherein the cradle support has a pivot axis and wherein the rotation motor has a rotation axis extending generally orthogonally to the pivot axis.

7. The robot specimen photography mount according to claim 6, wherein the pivot axis and the rotation axes intersect at an intersection point, and wherein the vacuum opening is located below the intersection point such that, when a specimen is mounted on the specimen mount, the specimen is located at the intersection point.

8. The robot specimen photography mount according claim 1, further comprising a counterweight mounted on the cradle support above the pivot axis.

9. The robot specimen photography mount according to claim 1, further comprising a bleed hole formed in the specimen mount below the vacuum opening.

10. The robot specimen photography mount according to claim 1, wherein the specimen mount further comprises a plurality of fingers extending outwardly therefrom around the vacuum opening.

11. The robot specimen photography mount according to claim 1, wherein the vacuum conduit is wrapped a plurality of revolutions around the rotation motor.

12. The robot specimen photography mount according to claim 1, wherein the cradle is rotatable 360° about the cradle support.

13. The robot specimen photography mount according to claim 1, further comprising a camera fixedly located relative to the mount.

14. A method of retaining and manipulating a specimen comprising steps of:
   (a) providing the robot specimen photography mount according to claim 1;
   (b) drawing a vacuum through the vacuum conduit;
   (c) placing the specimen on the specimen mount over the vacuum opening;
   (d) rotating the cradle relative to the cradle support; and
   (e) rotating the specimen mount relative to the cradle.

15. The method according to claim 14, further comprising the steps of:
   (f) fixing a camera relative to the mount;
   (g) taking a first picture of the specimen;
   (h) without touching the specimen, rotating at least one of the cradle and the specimen mount; and
   (i) taking a second picture of the specimen.

16. The method according to claim 14, further comprising the step of adjusting the amount of vacuum through the vacuum conduit.

17. The method according to claim 14, wherein step (d) is performed about a first axis and step (e) is performed about a second axis that intersects the first axis at intersection.

18. The method according to claim 17, wherein steps (d) and (e) retain the specimen at the intersection.

19. The method according to claim 14, further comprising providing a bleed hole in the specimen mount, and wherein step (b) comprises drawing a portion of the vacuum through the bleed hole.

20. The method according to claim 14, wherein step (a) further comprises providing a plurality of fingers extending outwardly from the specimen mount, and wherein step (c) comprises placing the specimen on the plurality fingers.

* * * * *